US011756390B2

(12) United States Patent
Amini et al.

(10) Patent No.: US 11,756,390 B2
(45) Date of Patent: Sep. 12, 2023

(54) NOTIFICATION PRIORITY SEQUENCING FOR VIDEO SECURITY

(71) Applicant: Arlo Technologies, Inc., Carlsbad, CA (US)

(72) Inventors: Peiman Amini, Mountain View, CA (US); Joseph Amalan Arul Emmanuel, Cupertino, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 155 days.

(21) Appl. No.: 17/358,259

(22) Filed: Jun. 25, 2021

(65) Prior Publication Data
US 2021/0319673 A1    Oct. 14, 2021

Related U.S. Application Data

(63) Continuation-in-part of application No. 16/276,422, filed on Feb. 14, 2019, now Pat. No. 11,076,161.

(60) Provisional application No. 62/633,017, filed on Feb. 20, 2018.

(51) Int. Cl.
| G08B 21/00 | (2006.01) |
| G08B 3/10 | (2006.01) |
| H04L 43/0882 | (2022.01) |
| H04N 7/18 | (2006.01) |

(52) U.S. Cl.
CPC ............ G08B 3/10 (2013.01); H04L 43/0882 (2013.01); H04N 7/183 (2013.01)

(58) Field of Classification Search
CPC .. G08B 3/10; G08B 29/186; G08B 13/19658; G08B 13/19684; G08B 25/005; G08B 25/08; G08B 13/1966; H04L 43/0882; H04L 65/61; H04L 65/70; H04L 65/80; H04L 45/306; H04L 41/16; H04L 43/0817; H04L 43/0888; H04N 7/183; H04N 23/661; H04N 7/181; G06V 20/52; G06V 40/20; H04W 24/08; H04W 52/0248; H04W 24/02; H04W 52/0261; H04W 84/18; H04W 88/18; Y02D 30/70
USPC ....................................................... 340/7.59
See application file for complete search history.

(56) References Cited

U.S. PATENT DOCUMENTS

| 7,460,476 B1 | 12/2008 | Morris et al. |
| 7,539,489 B1 | 5/2009 | Alexander |
| 7,633,869 B1 | 12/2009 | Morris et al. |
| 8,855,035 B2 | 10/2014 | Lemoine et al. |

(Continued)

FOREIGN PATENT DOCUMENTS

| CN | 102355695 A | 2/2012 |
| CN | 102811367 A | 12/2012 |

(Continued)

OTHER PUBLICATIONS

Chinese Office Action dated Jul. 28, 2021 in Chinese Patent Application No. 201910135485.8, 10 pages.

(Continued)

*Primary Examiner* — Marks Rushing
(74) *Attorney, Agent, or Firm* — Perkins Coie LLP

(57) ABSTRACT

Determining a sequence for providing a notification regarding activity recorded by a camera is described. In one aspect, a priority sequence for can be determined based on a variety of characteristics of the available devices registered with the home security system of the camera.

20 Claims, 4 Drawing Sheets

(56) References Cited

U.S. PATENT DOCUMENTS

| | | |
|---|---|---|
| 9,179,495 B1 | 11/2015 | Scherzer et al. |
| 9,451,484 B2 | 9/2016 | Boulton |
| 9,712,814 B2 | 7/2017 | Tanaka et al. |
| 9,996,750 B2 | 6/2018 | Campbell |
| 10,033,436 B2 | 7/2018 | Thubert et al. |
| 10,044,104 B1 | 8/2018 | Bartko et al. |
| 10,177,965 B1 | 1/2019 | Joshi et al. |
| 10,425,638 B2 | 9/2019 | Yu et al. |
| 11,228,792 B1 | 1/2022 | Ram et al. |
| 2002/0059627 A1 | 5/2002 | Islam et al. |
| 2002/0105921 A1 | 8/2002 | Sawyer et al. |
| 2002/0181637 A1 | 12/2002 | Nakabayashi |
| 2003/0055908 A1 | 3/2003 | Brown et al. |
| 2003/0063277 A1 | 4/2003 | Kennedy et al. |
| 2003/0193525 A1 | 10/2003 | Nygaard |
| 2005/0083947 A1 | 4/2005 | Vaarala et al. |
| 2005/0086569 A1 | 4/2005 | Hiddink et al. |
| 2005/0169209 A1 | 8/2005 | Miu et al. |
| 2007/0153916 A1 | 7/2007 | Demircin et al. |
| 2008/0020746 A1 | 1/2008 | Alexandar et al. |
| 2008/0025378 A1 | 1/2008 | Mahany et al. |
| 2008/0026748 A1 | 1/2008 | Alexander et al. |
| 2008/0069104 A1 | 3/2008 | Von et al. |
| 2008/0112315 A1 | 5/2008 | Hu et al. |
| 2008/0320108 A1 | 12/2008 | Murty et al. |
| 2009/0022222 A1 | 1/2009 | He et al. |
| 2009/0273679 A1 | 11/2009 | Gere et al. |
| 2009/0290019 A1 | 11/2009 | Mcnelis et al. |
| 2010/0080205 A1 | 4/2010 | Hirsch et al. |
| 2010/0097472 A1 | 4/2010 | Chathukutty et al. |
| 2010/0109934 A1 | 5/2010 | Drake et al. |
| 2010/0285753 A1 | 11/2010 | Foegelle |
| 2011/0159865 A1* | 6/2011 | Nakao ................ H04M 1/575 455/418 |
| 2011/0320555 A1* | 12/2011 | Qiu ................ H04L 63/0892 709/207 |
| 2012/0210853 A1 | 8/2012 | Abershitz et al. |
| 2012/0314875 A1 | 12/2012 | Lee et al. |
| 2013/0021912 A1 | 1/2013 | Finlow-bates et al. |
| 2013/0053653 A1 | 2/2013 | Cuddihy et al. |
| 2013/0089039 A1 | 4/2013 | Vashi et al. |
| 2013/0128947 A1 | 5/2013 | Fryer et al. |
| 2014/0036993 A1 | 2/2014 | Bae |
| 2014/0051379 A1 | 2/2014 | Ganesh et al. |
| 2014/0064120 A1 | 3/2014 | Sethuraman et al. |
| 2014/0092755 A1 | 4/2014 | van de Ven et al. |
| 2014/0115114 A1 | 4/2014 | Garmark et al. |
| 2014/0169195 A1 | 6/2014 | Hsin et al. |
| 2014/0169509 A1 | 6/2014 | Tsofe |
| 2014/0240491 A1 | 8/2014 | Kauniskangas et al. |
| 2014/0269655 A1 | 9/2014 | Du et al. |
| 2014/0307707 A1 | 10/2014 | Mestanov et al. |
| 2014/0358592 A1 | 12/2014 | Wedig et al. |
| 2014/0368601 A1 | 12/2014 | Decharms |
| 2015/0098354 A1 | 4/2015 | Grovas |
| 2015/0185857 A1 | 7/2015 | Jung |
| 2015/0229426 A1 | 8/2015 | Yu et al. |
| 2015/0312572 A1 | 10/2015 | Owen |
| 2015/0319411 A1 | 11/2015 | Kasmir et al. |
| 2015/0349859 A1 | 12/2015 | Emmanuel et al. |
| 2015/0381310 A1 | 12/2015 | Hammarwall et al. |
| 2016/0105644 A1 | 4/2016 | Smith et al. |
| 2016/0112935 A1 | 4/2016 | Ahuja et al. |
| 2016/0114887 A1 | 4/2016 | Zhou et al. |
| 2016/0125714 A1 | 5/2016 | Kates et al. |
| 2016/0165620 A1 | 6/2016 | Dagen et al. |
| 2016/0225158 A1 | 8/2016 | Tsubota et al. |
| 2016/0243441 A1 | 8/2016 | Garbowski et al. |
| 2016/0262120 A1 | 9/2016 | Shani et al. |
| 2016/0278104 A1 | 9/2016 | Hiremath et al. |
| 2016/0337243 A1 | 11/2016 | Cui et al. |
| 2016/0366702 A1 | 12/2016 | Baba et al. |
| 2017/0055179 A1 | 2/2017 | Radunovic et al. |
| 2017/0070732 A1 | 3/2017 | Roulet et al. |
| 2017/0078242 A1 | 3/2017 | Nakamura et al. |
| 2017/0180442 A1 | 6/2017 | Lawrence |
| 2017/0192700 A1 | 7/2017 | Wozniak |
| 2017/0237673 A1 | 8/2017 | Law |
| 2017/0242129 A1 | 8/2017 | Kallankari et al. |
| 2017/0244712 A1 | 8/2017 | Meredith et al. |
| 2017/0301201 A1 | 10/2017 | Siann et al. |
| 2017/0301203 A1 | 10/2017 | Matsuura |
| 2018/0206176 A1 | 7/2018 | Panteleev et al. |
| 2018/0254099 A1 | 9/2018 | Beydoun et al. |
| 2018/0306904 A1 | 10/2018 | Vacanti |
| 2018/0375594 A1 | 12/2018 | Kildal et al. |
| 2019/0014005 A1 | 1/2019 | Lessmann |
| 2019/0014388 A1 | 1/2019 | Rutledge et al. |
| 2019/0132371 A1 | 5/2019 | Bhat et al. |
| 2019/0162769 A1 | 5/2019 | Zhao et al. |
| 2019/0200013 A1 | 6/2019 | Wu et al. |
| 2019/0202657 A1 | 7/2019 | Li et al. |
| 2019/0222897 A1 | 7/2019 | Frusina et al. |
| 2019/0261370 A1 | 8/2019 | Amini et al. |
| 2019/0282897 A1 | 9/2019 | Posin |
| 2019/0364505 A1 | 11/2019 | Wang et al. |
| 2022/0122149 A1 | 4/2022 | Kim et al. |

FOREIGN PATENT DOCUMENTS

| | | |
|---|---|---|
| CN | 103493397 A | 1/2014 |
| CN | 104066146 A | 9/2014 |
| CN | 105246131 A | 1/2016 |
| CN | 106534634 A | 3/2017 |
| CN | 106954026 A | 7/2017 |
| CN | 107370550 A | 11/2017 |
| CN | 110177393 A | 8/2019 |
| CN | 110177835 A | 8/2019 |
| JP | 2010232819 A | 10/2010 |
| WO | 2006075052 A1 | 7/2006 |
| WO | 2009048660 A2 | 4/2009 |

OTHER PUBLICATIONS

"Amazon Kinesis Video Streams Developer Guide", Amazon Web Services, Inc., 2018, 136 pp.

Ananthanarayanan, Ganesh, et al., "Real-time Video Analytics—the killer app for edge computing", Microsoft Research; IEEE Computer Society, 11 pages.

Girshick, Ross, "Fast R-CNN Object detection with Caffe", Microsoft Research, 30 pages.

Hosseini, Hossein, et al., "Attacking Automatic Video Analysis Algorithms: A Case Study of Google Cloud Video Intelligence API", University of Washington, Seattle, WA, Worcester Polytechnic Institute, Worcester, MA, 12 pages.

* cited by examiner

NOTIFICATION PRIORITY SEQUENCING FOR VIDEO SECURITY

CLAIM FOR PRIORITY

This application is a continuation application of U.S. patent application Ser. No. 16/276,422, entitled "Notification Priority Sequencing for Video Security," and filed on Feb. 14, 2019, which claims priority to U.S. Provisional Patent Application No. 62/633,017, entitled "Optimization and Testing of Wireless Devices," and filed on Feb. 20, 2018. The content of the above-identified applications are incorporated herein by reference in their entirety.

TECHNICAL FIELD

The disclosure relates to security systems, and in particular providing notifications to field devices regarding video data.

BACKGROUND

Security systems for home or business uses can include a base station in communication with cameras mounted within or outside of a structure to record activity. When relevant or alarming activity is determined to be occurring, a user might be notified regarding the occurrence of the activity, and whether any action should be taken.

Multiple users might be registered with the security system. At times, only a single notification to one user might be provided, for example, when a visitor is at a door to the home or business. A notification can include video data depicting the visitor at the door and the user receiving the notification can use an electronic device (e.g., a smartphone) to receive the notification and to verbally communicate with the visitor via the camera and base station. However, if one user receives the notification but does not respond, the activity might not be addressed even though another user registered with the security system might have been available to receive a notification and respond. Thus, the robustness of the security system can be degraded.

SUMMARY

Some of the subject matter described herein includes a method including receiving video data indicative of activity captured within a field of view of a camera; determining characteristics of a first device and a second device associated with a security system related to the camera; determining, by a processor, a priority sequence for providing a notification regarding occurrence of the activity based on the characteristics, the priority sequence indicating that a first device is to be provided the notification before a second device; providing the notification to the first device; receiving a response from the first device, the response indicating an action to be performed in response to the occurrence of the activity; and performing the action based on the response indicating that the action is to be performed in response to the occurrence of the activity.

In some implementations, determining the characteristics includes: determining a first network bandwidth available to the first device and a second network bandwidth available to the second device, and wherein the first network bandwidth is higher than the second network bandwidth.

In some implementations, determining the characteristics includes: determining a first location of the first device and a second location of the second device, and wherein the first location is a first location type, the second location is a second location type, one of the first location type or the second location type being residential and the other being commercial.

In some implementations, determining the characteristics includes: determining first operational characteristics of the first device and second operational characteristics of the second device, the first operational characteristics being different than the second operational characteristics, and the priority sequence based on the first operational characteristics and the second operational characteristics.

In some implementations, the first operational characteristics include a first video processing functionality of the first device, and the second operational characteristics include a second video processing functionality of the second device, the first video processing functionality providing a higher quality video processing than the second video processing functionality.

In some implementations, determining the characteristics includes: determining a first history of the first device responding to previous notifications and a second history of the second device responding to previous notifications, and wherein the priority sequence is based on the first history and the second history.

In some implementations, wherein the notification is a voice call placed to the first device, and the action performed is to contact emergency services in response to the occurrence of the activity.

Some of the subject matter described herein includes an electronic device, comprising: one or more processors; and memory storing instructions, wherein the processor is configured to execute the instructions such that the processor and memory are configured to: receive video data indicative of activity captured within a field of view of a camera; determine characteristics of a first device and a second device associated with a security system related to the camera; determine a priority sequence for providing a notification regarding occurrence of the activity based on the characteristics, the priority sequence indicating that a first device is to be provided the notification before a second device; provide the notification to the first device; receive a response from the first device, the response indicating an action to be performed in response to the occurrence of the activity; and perform the action based on the response indicating that the action is to be performed in response to the occurrence of the activity.

In some implementations, determining the characteristics includes: determine a first network bandwidth available to the first device and a second network bandwidth available to the second device, and wherein the first network bandwidth is higher than the second network bandwidth.

In some implementations, determining the characteristics includes: determine a first location of the first device and a second location of the second device, and wherein the first location is a first location type, the second location is a second location type, one of the first location type or the second location type being residential and the other being commercial.

In some implementations, determining the characteristics includes: determine first operational characteristics of the first device and second operational characteristics of the second device, the first operational characteristics being different than the second operational characteristics, and the priority sequence based on the first operational characteristics and the second operational characteristics.

In some implementations, the first operational characteristics include a first video processing functionality of the first device, and the second operational characteristics include a second video processing functionality of the second device, the first video processing functionality providing a higher quality video processing than the second video processing functionality.

In some implementations, determining the characteristics includes: determine a first history of the first device responding to previous notifications and a second history of the second device responding to previous notifications, and wherein the priority sequence is based on the first history and the second history.

In some implementations, the notification is a voice call placed to the first device, and the action performed is to contact emergency services in response to the occurrence of the activity.

Some of the subject matter described herein includes a computer program product including one or more non-transitory computer-readable media storing computer program instructions, execution of which by a processing system causes the processing system to perform operations comprising: receive video data indicative of activity captured within a field of view of a camera; determine characteristics of a first device and a second device associated with a security system related to the camera; determine a priority sequence for providing a notification regarding occurrence of the activity based on the characteristics, the priority sequence indicating that a first device is to be provided the notification before a second device; provide the notification to the first device; receive a response from the first device, the response indicating an action to be performed in response to the occurrence of the activity; and perform the action based on the response indicating that the action is to be performed in response to the occurrence of the activity.

In some implementations, determining the characteristics includes: determine a first network bandwidth available to the first device and a second network bandwidth available to the second device, and wherein the first network bandwidth is higher than the second network bandwidth.

In some implementations, determining the characteristics includes: determine a first location of the first device and a second location of the second device, and wherein the first location is a first location type, the second location is a second location type, one of the first location type or the second location type being residential and the other being commercial.

In some implementations, determining the characteristics includes: determine first operational characteristics of the first device and second operational characteristics of the second device, the first operational characteristics being different than the second operational characteristics, and the priority sequence based on the first operational characteristics and the second operational characteristics.

In some implementations, the first operational characteristics include a first video processing functionality of the first device, and the second operational characteristics include a second video processing functionality of the second device, the first video processing functionality providing a higher quality video processing than the second video processing functionality.

In some implementations, determining the characteristics includes: determine a first history of the first device responding to previous notifications and a second history of the second device responding to previous notifications, and wherein the priority sequence is based on the first history and the second history.

DETAILED DESCRIPTION

This disclosure describes techniques for determining which user is to be selected for being provided a notification regarding activity captured by a camera of a security system. In one example, a family can have a home security system including a base station in communication with cameras inside and outside the home. When alarming or eventful activity is captured by one of the cameras, the base station can determine this and generate data to provide a notification with video data depicting the activity. Additionally, the base station can include communication capabilities to contact a user regarding the activity, for example, by placing a cellular phone call to verbally alert the user to the situation at the home. The user can respond to the notification, for example, by verbally instructing the base station to place a call to emergency services (e.g., call police via "911").

Because the family can have multiple users that can be contacted to provide a notification, the base station can determine a sequence or priority of providing notifications to users such that only some (e.g., not all) of the users can be contacted. For example, in some activities such as a visitor being detected at the front door, a single user might be contacted via a notification to be provided video data depicting the visitor as well as offered the capability to communicate to the visitor via a speaker and microphone of a camera positioned at the front door. The users can be prioritized based on factors including their history of responding to notifications, current location, network bandwidth available to their device at the current location, and operational characteristics of their device (e.g., an electronic device such as a smartphone, a tablet, a laptop computer, a desktop computer, a smartwatch, etc.).

In some implementations, the characteristics of the notification can also be determined using the aforementioned factors for prioritizing the users to be provided notifications. For example, the type of notification (e.g., whether the notification includes a verbal alert asking the user whether emergency services should be called), a type of compression to use for providing video data, etc.), and other characteristics can be determined by the base station.

By prioritizing the users to receive the notification, the base station can provide a more robust security system because a user more likely to view and respond to the notification can be prioritized over other users. This can improve the user experience of the security system implemented by the base station.

Figure 1:
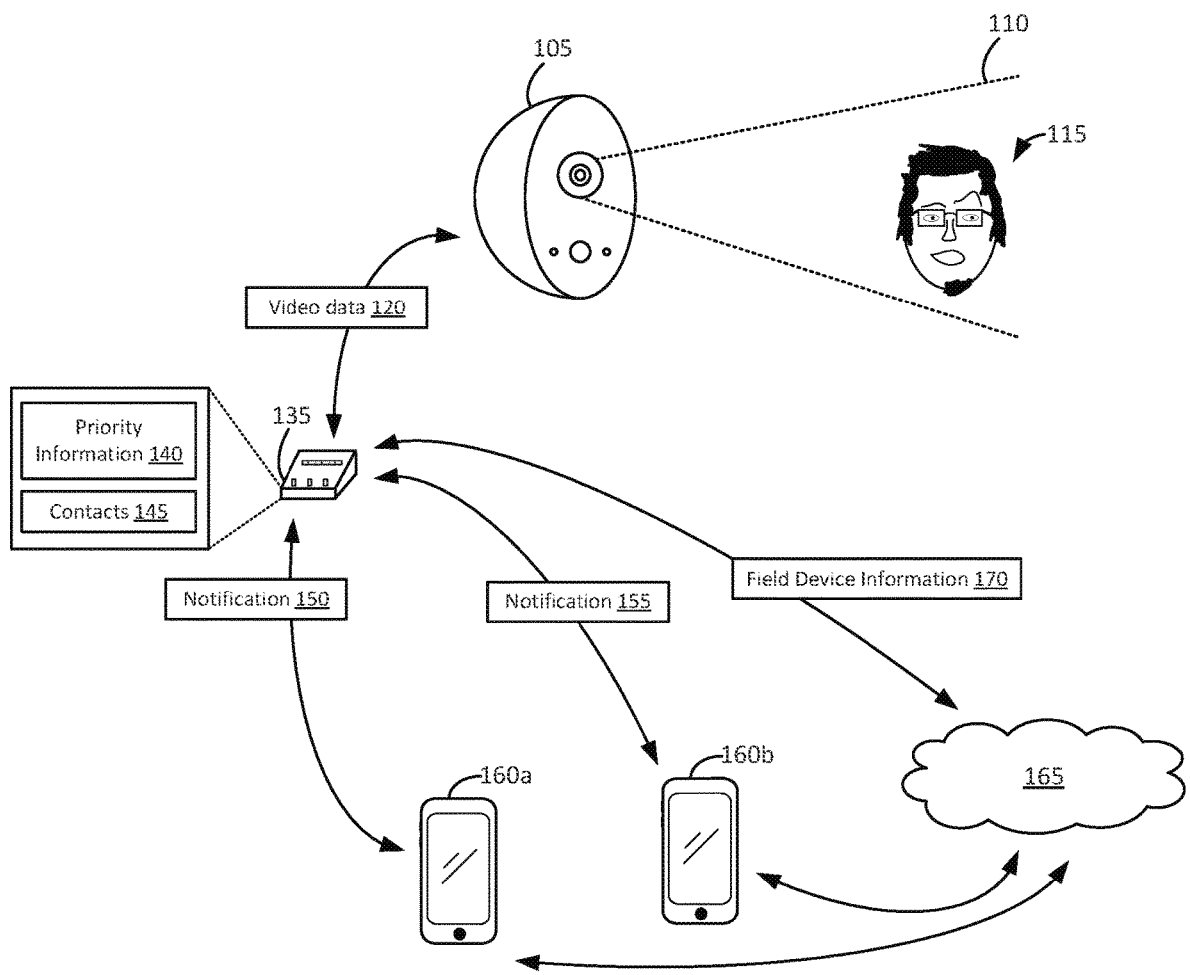
FIG. 1 illustrates an example of generating a notification regarding an activity depicted in video data.

In more detail, FIG. 1 illustrates an example of generating a notification regarding an activity depicted in video data. In FIG. 1, base station 135 can be in wireless communication with camera 105 (e.g., using one of the Institute of Electrical and Electronics Engineers (IEEE) 802.11 wireless local area network (WLAN) standards, a personal area network standard such as Bluetooth, etc.). Camera 105 can include an image sensor capable of capturing image information used to generate video data of activity occurring within field of vision 110. In FIG. 1, this can include generating video data 120 depicting visitor 115 at a front door of a home.

Video data 120 can be provided to base station 135 and base station 135 can analyze the content of video data 120 to determine that visitor 115 is at the front door. A visitor at the front door can be an activity that a user from the home should be aware of and, therefore, base station 135 can generate a notification to be provided to the user such that the activity can be responded to, for example, by enabling a two-way audio conversation using a microphone and a speaker of camera 105 to communicate with visitor 115.

However, the home might be a residence for multiple people. For example, in FIG. 1, device 160a might be the smartphone of one resident of the home, and device 160b might be the smartphone of another resident of the home. Only a single user should be allowed to have a conversation with visitor 115 and, therefore, base station 135 can determine which of device 160a or 160b can be provided notification 150 or 155, respectively, to provide an alert regarding visitor 115.

The possible users who can be contacted can be stored by base station 135 as contacts 145 in FIG. 1. Base station 135 can further determine priority information 140 which can be a sequence of providing notifications to users based on a determined priority. In some implementations, priority information 140 can be updated using a hidden markov model (HMM), Viterbi's algorithm, or other machine learning or artificial intelligence techniques to predict which user should be provided a notification by determining the priorities.

For example, base station 135 can determine a variety of factors regarding how users have responded to notifications in the past, a current location of a user or device, network bandwidth available to a device at the current location, and operational characteristics of the device such as its battery life and functional capabilities (e.g., video processing functionalities including the types of video codecs or other multimedia capabilities used by the device). Based on these factors, priority information 140 can be generated and used to provide a notification.

For example, if video data 120 depicting visitor 115 is received by base station 135 at 9:00 a.m. on a Friday, base station might determine that device 160a should be prioritized over device 160b in being provided notification 150 because device 160a has in the past responded to notifications on weekday mornings while device 160b has not. For example, in the past at 9:00 a.m. on a Friday, the user of device 160a might have reviewed a notification and indicated that the activity that the notification is regarding is alarming (e.g., emergency services should be called). However, if the same activity occurred at 8:00 p.m. on a Saturday, then device 160b might be prioritized over device 160a and provided notification 155 due to having a history of responding to more notifications at that time. Thus, over time, base station 135 can learn which user to provide a notification using a variety of machine learning or artificial intelligence techniques to learn the schedules of various users.

In addition to how users respond to notifications on their devices over history, other factors can also be considered. For example, devices 160a and 160b can include software installed to communicate with cloud server 165. Cloud server 165 can be a cloud-based network server collecting data from devices 160a and 160b that can then be provided to base station 135. For example, cloud server 165 can receive geographical information such as a current location of the devices. This information can then be provided to base station 135. However, in other implementations, this information can be transmitted from devices 160a and 160b to base station 135 without the use of cloud server 165.

The network bandwidth available to devices 160a and 160b can also be provided to base station 135 in a similar manner. The network bandwidth can be used by base station 135 to determine the data transfer rate available to communicate with devices 160a and 160b. The network bandwidth of the devices can then be used to generate priority information 140. For example, the device with a higher network bandwidth can be prioritized over the other device. This can allow for an increase likelihood that a high-quality video can be viewed by the device with the higher network bandwidth rather than the device with the lower network bandwidth viewing a lower-quality video.

The current location of devices 160a and 160b can also be provided to base station 135 in a similar manner and used to generate priority information 140. For example, if device 160a is determined to be in an office and device 160b is in a car along a road, then device 160a might be prioritized over device 160b because being in an office might offer a better opportunity to respond to the notification. Commercial or business locations can be prioritized over residential locations, or vice versa.

The operational characteristics of devices 160a and 160b can also be provided to base station 135 in a similar manner. For example, the battery level of devices 160a and 160 can be used by base station 135 to generate priority information 140. In one example, if the battery level of device 160a is below a threshold (e.g., less than ten percent) and device 160b is above the threshold, then device 160b can be prioritized because it has a higher battery level and, therefore, might be able to more reliably view the notification, and provide a response without having the battery of device 160b run out of charge.

Other operational characteristics can include the capabilities of the devices. For example, a device that can process higher-quality video data can be prioritized over a device that does not have the capability to process higher-quality video data. Thus, the video processing capabilities of the devices can be used to determine the sequence.

Figure 2:
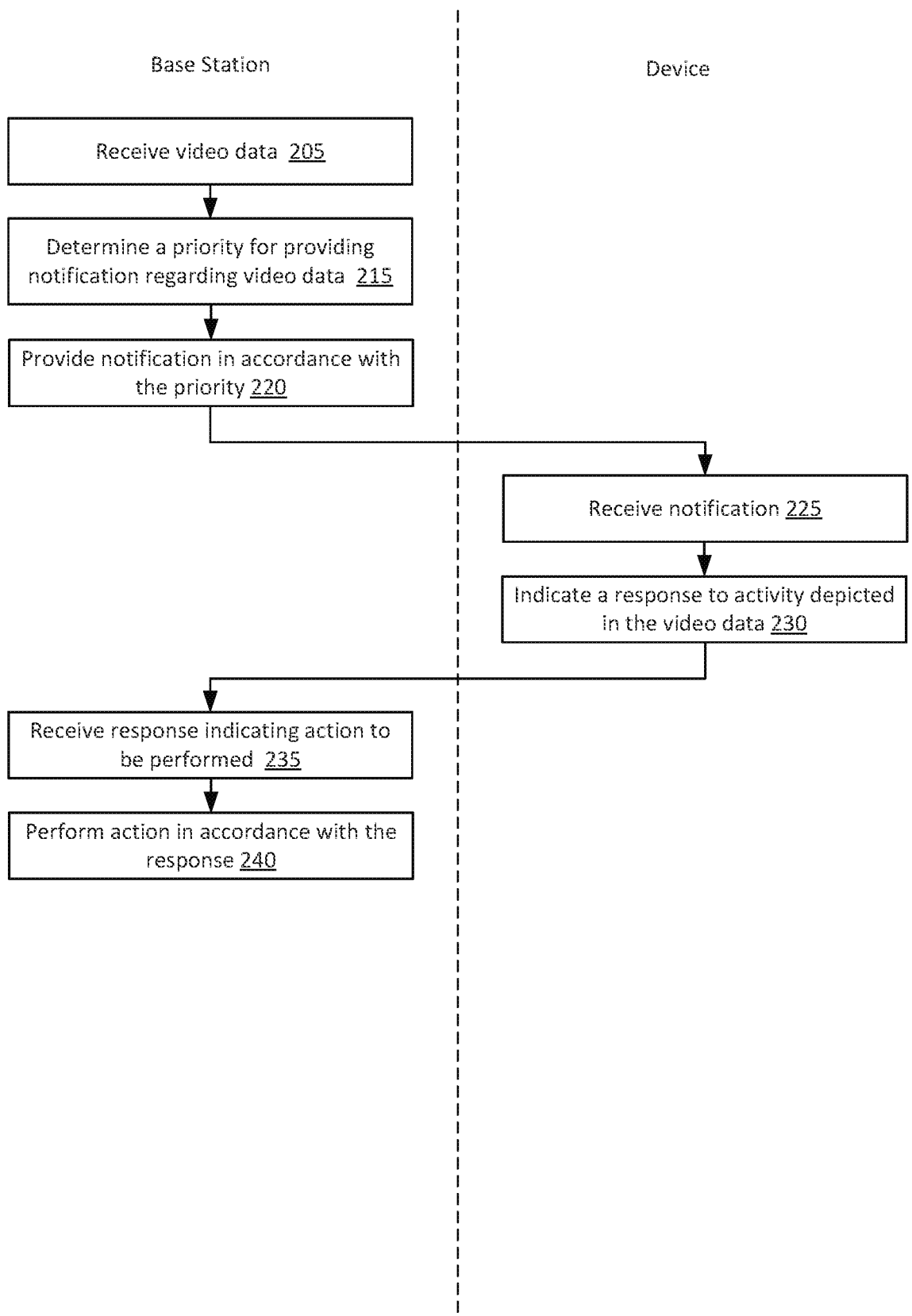
FIG. 2 illustrates an example of a block diagram for generating a notification.

FIG. 2 illustrates an example of a block diagram for generating a notification. In FIG. 2, video data can be received by a base station (205). For example, in FIG. 1, video data 120 can be generated by camera 105 and provided to base station 135.

Base station 135 can then determine a priority for providing a notification regarding the video data (215). For example, base station 135 can identify, using contacts 145, that one or both of device 160a and device 160b should be provided notification 150 or notification 155, respectively, to alert a user regarding activity depicted in video data 120.

Figure 3:
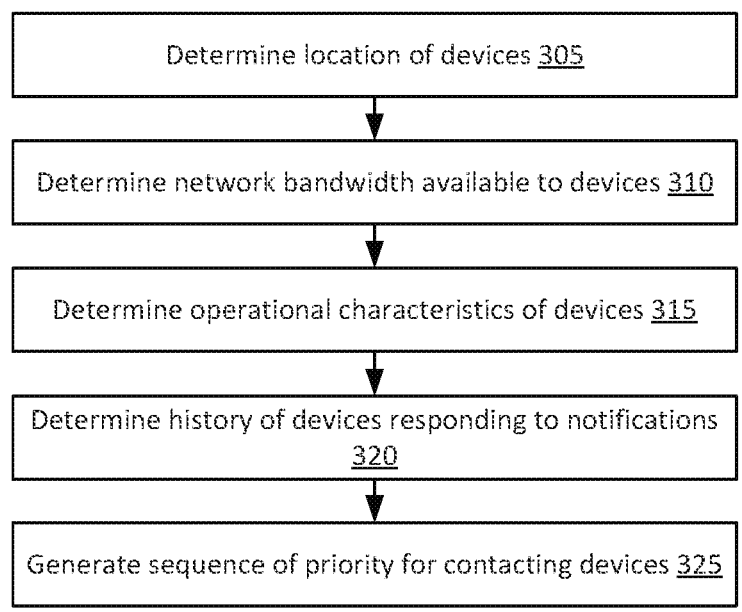
FIG. 3 illustrates an example of a block diagram for generating a sequence for contacting field devices in accordance with a priority ranking.

Generating the priority can be based on a variety of factors. FIG. 3 illustrates an example of a block diagram for generating a sequence for contacting field devices in accordance with a priority ranking. In FIG. 3, the location of devices can be determined (305), the network bandwidth available to devices can be determined (310), operational characteristics of the devices can be determined (315), and the history of the devices responding to previous notifications can be determined (320). One or more of these factors can be used to generate a sequence of priority for contacting the devices (325).

Returning to FIG. 2, a notification in accordance with the priority can be provided (220) and a device can receive the notification (225). The notification can be a message that is displayed in a graphical user interface (GUI) on the device. In some implementations, the message can indicate the activity (e.g., an intruder detected on a camera, motion detected, movement depicted in an object on a camera, etc.), provide a video depicting the activity, and even provide audio playback (along with the video playback) as well as offer two-way audio communication, as previously discussed. A notification can also include a phone call with a verbal prompt asking for the user of the device to provide a response, for example, to verbally indicate whether emergency services should be called, whether it is a false alarm, etc.

Additionally, the characteristics of the notification can be based on any of the aforementioned factors. For example, if the network bandwidth available for the device is lower than a threshold, then a still image of the activity might be provided, but if the network bandwidth is high then video playback can be provided. In another implementation, audio might not be provided if the network bandwidth available to the device is low. Thus, the content of the notification can be based on the aforementioned factors.

Additionally, the type of notification (e.g., text message, message via the operating system (OS) or application installed on the device, phone call, etc.) can also be based on the aforementioned factors. For example, if the device is in a location with an acceptable cellular network coverage, then a phone call can be placed to the device (by the base station) to provide the notification. However, if the device is not within an acceptable cellular network coverage, or if the network bandwidth of the cellular connection is not acceptable, then another type of notification can be provided.

The user of the device can then indicate a response to the activity depicted in the video data (230). For example, the activity can be deemed to be a security incident and indicate that emergency services should be called, an alarm should be triggered to turn on within the home, or other security-related activity.

The base station can then receive the response indicating the action to be performed (235) and then perform the action in accordance with the response (240).

Though some of the examples describe a sequence of priority for contacting devices one-at-a-time, in other implementations, multiple devices can be provided notifications at the same or similar times. For example, two devices might be provided a notification first, and if neither of the two devices respond, then a third device can be notified next.

The base station can also determine characteristics of the video data and generate the priority for notifications. For example, the content of the video data can be analyzed by the base station to determine whether unidentified people are depicted, whether animals are depicted, movement of objects, etc. Thus, different types of content can be used to adjust the notification priority. For example, if people are detected, then a parent of the home can be contacted, but if an animal is detected then children of the home can be provided the notification.

In some implementations, multiple cameras can be placed within and outside of the home. As activity is detected, video data can be generated and provided by these different cameras to the base station. The camera being used to generate the video data (i.e., the camera detecting a possible security-related incident) can be determined and used to determine the priority of notifications. For example, activity occurring outside of the home can have one priority sequence, but activity then occurring within the home can result in a different priority sequence. This would result in different devices being prioritized based on the location of the activity.

In another example, activity outside of the home can result in a sequential priority in which one device can be contacted at a time, as previously discussed. However, activity within the home can result in every device to be contacted. Thus, different levels of security awareness can be provided and different levels can result in different priorities.

In some implementations, base station 135 and camera 105 can be communicatively coupled with a wireless mesh network within the home. The wireless mesh network can have a variety of nodes implementing a network topology to provide wireless communications to devices within and outside of the home.

Figure 4:
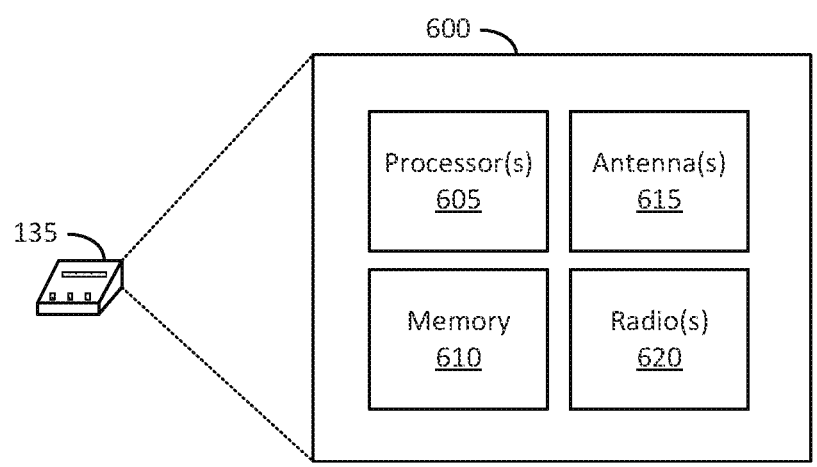
FIG. 4 illustrates an example of a simplified block diagram of an electronic device which may be used with some implementations.

FIG. 4 illustrates an example of a simplified block diagram of an electronic device which may be used with particular implementations. The electronic device of FIG. 4 can implement any of the functionalities and features discussed above, including base station 135.

For example, FIG. 6 portrays a high-level block diagram illustrating a processing device 600 implementing base station 135 in which at least some operations described herein can be implemented. In some implementations, the block diagram can also implement the other devices described herein, such as cameras and radar sensos. The processing system can be a system that can run any of the methods/algorithms/techniques described above.

In the illustrated embodiment, the processing device 600 includes one or more processors 605, memory 610, antenna 615, and one or more radios 620. Processors 605 may be or include, for example, one or more general-purpose programmable microprocessors or microprocessor cores, microcontrollers, application specific integrated circuits (ASICs), programmable gate arrays, or the like, or a combination of such devices. The processor(s) 605 control the overall operation of the processing device 600. Memory 610 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 610 may store data and instructions that configure the processor(s) 605 to execute operations in accordance with the techniques described above. Processing device 600 can also include communication devices that may be or include, for example, an Ethernet adapter, cable modem, Wi-Fi adapter, cellular transceiver, Bluetooth transceiver, or the like, or a combination thereof. Depending on the specific nature and purpose of the processing device 600, it can also include I/O devices that can include devices such as a display (which may be a touch screen display), audio speaker, keyboard, mouse or other pointing device, microphone, camera, etc. Processing device 600 can also include radios 620, for example, a different radio for each band that communication links can be established within. Processing device 600 can also include one or more antennas 615 for aiding the establishing of the communication links. For example, radio 620 can generate a signal that is transmitted via antenna 615.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 600 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A method comprising:
receiving, by a computer system, video data at a particular time;
determining, by the computer system, a first video processing functionality of a first device;
determining, by the computer system, a second video processing functionality of a second device, the first video processing functionality providing a higher quality video processing than the second video processing functionality;
determining, by the computer system, a priority sequence using machine learning, based on the first video processing functionality, the second video processing functionality, and a history of responses by the first device and the second device to previous notifications at the particular time,
wherein the history indicates that the first device has responded to the previous notifications at the particular time,
wherein the history indicates a lack of responses from the second device to the previous notifications at the particular time, and
wherein the priority sequence is for providing a notification to at least one of the first device or the second device based on the video data; and
providing, by the computer system, the notification to the first device based on the priority sequence.

2. The method of claim 1, wherein determining the priority sequence is based on a hidden Markov model (HMM) or Viterbi's algorithm.

3. The method of claim 1, comprising:
determining, by the computer system, a first network bandwidth available to the first device and a second network bandwidth available to the second device, wherein the first network bandwidth is greater than the second network bandwidth.

4. The method of claim 1, comprising:
determining, by the computer system, a first location of the first device and a second location of the second device, wherein the first location is a first location type, the second location is a second location type, and one of the first location type or the second location type is residential and the other is commercial.

5. The method of claim 1, comprising:
determining, by the computer system, the history of responses by the first device and the second device to previous notifications.

6. The method of claim 1, wherein the notification is a voice call placed to the first device, and
wherein the video data is indicative of activity captured within a field of view of a camera related to a security system associated with the first device and the second device.

7. The method of claim 6, further comprising:
receiving, by the computer system, a response from the first device, the response indicating an action to be performed in response to the occurrence of the activity; and
performing, by the computer system, an action based on the response indicating that the action is to be performed in response to the occurrence of the activity.

8. The method of claim 7, wherein performing the action comprises contacting, by the computer system, emergency services in response to the occurrence of the activity.

9. The method of claim 1, further comprising receiving, by the computer system, a first location of the first device and a second location of the second device from a cloud server, wherein determining the priority sequence is based on the first location and the second location.

10. An electronic device, comprising:
one or more processors; and
non-transitory memory storing instructions, wherein the processor is configured to execute the instructions such that the processor and memory are configured to:
receive video data at a particular time;
determine a first video processing functionality of a first device;
determine a second video processing functionality of a second device, the first video processing functionality providing a higher quality video processing than the second video processing functionality;
determine a priority sequence using machine learning, based on the first video processing functionality, the second video processing functionality, and a history of responses by the first device and the second device to previous notifications at the particular time,
wherein the history indicates that the first device has responded to the previous notifications at the particular time,
wherein the history indicates a lack of responses from the second device to the previous notifications at the particular time, and
wherein the priority sequence is for providing a notification to at least one of the first device or the second device based on the video data; and
provide the notification to the first device based on the priority sequence.

11. The electronic device of claim 10, wherein determining the priority sequence is based on a hidden Markov model (HMM) or Viterbi's algorithm.

12. The electronic device of claim 10, wherein the processor and memory are configured to:
determine a first network bandwidth available to the first device and a second network bandwidth available to the second device, wherein the first network bandwidth is greater than the second network bandwidth.

13. The electronic device of claim 10, wherein the processor and memory are configured to:
determine a first location of the first device and a second location of the second device, wherein the first location is a first location type, the second location is a second location type, and one of the first location type or the second location type is residential and the other is commercial.

14. The electronic device of claim 10, wherein the processor and memory are configured to:
determine the history of responses by the first device and the second device to previous notifications.

15. The electronic device of claim 10, wherein the notification is a voice call placed to the first device, and
wherein the video data is indicative of activity captured within a field of view of a camera related to a security system associated with the first device and the second device.

16. The electronic device of claim 15, wherein the processor is further configured to execute the instructions such that the processor and memory are further configured to:
receive a response from the first device, the response indicating an action to be performed in response to the occurrence of the activity; and
perform an action based on the response indicating that the action is to be performed in response to the occurrence of the activity.

17. The electronic device of claim 16, wherein performing the action comprises contacting emergency services in response to the occurrence of the activity.

18. The electronic device of claim 10, wherein the processor is further configured to execute the instructions such that the processor and memory are further configured to:
receive a first location of the first device and a second location of the second device from a cloud server, wherein determining the priority sequence is based on the first location and the second location.

19. A computer program product including one or more non-transitory computer-readable media storing computer program instructions, execution of which by a processing system causes the processing system to:
receive video data at a particular time;
determine a first video processing functionality of a first device;
determine a second video processing functionality of a second device, the first video processing functionality providing a higher quality video processing than the second video processing functionality;
determine a priority sequence using machine learning, based on the first video processing functionality, the second video processing functionality, and a history of responses by the first device and the second device to previous notifications at the particular time,
wherein the history indicates that the first device has responded to the previous notifications at the particular time,
wherein the history indicates a lack of responses from the second device to the previous notifications at the particular time, and
wherein the priority sequence is for providing a notification based on the first operational characteristics and the second operational characteristics; and
provide the notification to the first device based on the priority sequence.

20. The computer program product of claim 19, wherein determining the priority sequence is based on a hidden Markov model (HMM) or Viterbi's algorithm.

* * * * *